(12) United States Patent
Jensen et al.

(10) Patent No.: US 12,130,098 B2
(45) Date of Patent: Oct. 29, 2024

(54) COMBINED DEAERATOR AND MANIFOLD FOR A COOLANT SYSTEM OF A VEHICLE

(71) Applicant: Cooper-Standard Automotive Inc., Northville, MI (US)

(72) Inventors: Jacob C. Jensen, Farmington Hills, MI (US); Tisiphone A. Titus, Warren, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 203 days.

(21) Appl. No.: 17/888,247

(22) Filed: Aug. 15, 2022

(65) Prior Publication Data

US 2024/0053111 A1 Feb. 15, 2024

(51) Int. Cl.
*F28F 9/02* (2006.01)
*F01P 11/02* (2006.01)

(52) U.S. Cl.
CPC ............ *F28F 9/0231* (2013.01); *F01P 11/028* (2013.01)

(58) Field of Classification Search
CPC ....... F28F 9/0231; F01P 11/028; F01P 11/029
USPC .................................................. 165/104.32
See application file for complete search history.

(56) References Cited

U.S. PATENT DOCUMENTS

| | | | | |
|---|---|---|---|---|
| 6,581,579 B1 * | 6/2003 | Knight | ................... | F02M 37/20 123/541 |
| 9,695,721 B2 * | 7/2017 | Maloney | ............. | F01N 13/1855 |
| 11,039,552 B2 * | 6/2021 | Krug, Jr. | ............ | H05K 7/20781 |
| 11,692,476 B1 * | 7/2023 | Jensen | ................... | F01P 11/029 123/41.54 |
| 11,713,708 B2 * | 8/2023 | Petschenyk | ............. | F01P 7/165 123/41.01 |
| 2018/0283261 A1 * | 10/2018 | Morishita | .............. | F01P 11/029 |
| 2020/0149463 A1 * | 5/2020 | Trythall | ............... | B01D 36/001 |

FOREIGN PATENT DOCUMENTS

| | | |
|---|---|---|
| DE | 19754797 A1 | 6/1999 |
| DE | 102020216127 A1 | 1/2022 |
| GN | 2561599 A | 10/2018 |
| JP | 2015140734 A * | 8/2015 |
| JP | 2015140735 A * | 8/2015 |

OTHER PUBLICATIONS

Extended Search Report for 23191301.3 dated Dec. 21, 2023.

* cited by examiner

*Primary Examiner* — Jon T. Schermerhorn, Jr.
(74) *Attorney, Agent, or Firm* — Paschall & Associates, LLC; James C. Paschall; Anthony Miologos

(57) ABSTRACT

This disclosure pertains to a device for removing air from a coolant liquid of a coolant system. The device has a body with a swirl pot at one end and a manifold extending from the swirl pot to an opposed end of the body. The swirl pot has a fluid inlet for receiving coolant fluid of a first air concentration and a fluid outlet for discharging coolant fluid of a second concentration less than the first. The manifold has a first fluid pipe connected to a plurality of outlet pipes that extend transversely to the first fluid pipe and are spaced there along.

20 Claims, 7 Drawing Sheets

COMBINED DEAERATOR AND MANIFOLD FOR A COOLANT SYSTEM OF A VEHICLE

TECHNICAL FIELD

This disclosure is generally directed to a device for removing air from a coolant fluid in a coolant system. More specifically, it relates to a deaerator and manifold in a body for removing air from a coolant liquid in a coolant system for a vehicle.

BACKGROUND

Coolant systems for internal combustion engines use a coolant pump to drive a flow of a coolant liquid in contact with a heat generating component to remove heat and then to a heat exchanger such as a radiator. The radiator cools the liquid, and the cooled liquid is returned to the heat generating component in a continuous cycle. Air bubbles are generated in the coolant liquid as a result of fluid being vaporized by the heat generating component and by high pressure combustion gasses escaping from the engine combustion chamber. These bubbles cause thermal stress to coolant pipes of the heat exchanger resulting in a decrease in heat exchange performance. Thus, it is imperative to remove these bubbles from the coolant system.

Air bubble removal devices such as swirl pots have been developed to remove air bubbles from coolant liquid. A swirl pot is placed in the fluid circulation system and has a fluid input connected to the heat generating component, a fluid outlet connected to the heat exchanger, and a bubble outlet connected by a tube or pipe to a degas bottle mounted above the swirl pot. The swirl pot has a generally curved wall defining a chamber and has a cross-sectional area greater than the fluid outlet. The swirl pot is dimensioned such that the incoming fluid dwells within the chamber for a sufficient period for the air bubbles to leave the coolant liquid and exit through the bubble outlet. Thus, deaerated coolant fluid is supplied to the heat exchanger.

The piping system in a coolant system can become quite complicated with numerous heat-generating components connected to the swirl pot. It is common to have numerous connections and connecting points located throughout the system which makes servicing the system complex and difficult to maintain. Thus, there is a need for a deaerator device that simplifies the piping in a coolant system.

SUMMARY

This disclosure relates to a combined deaerator and manifold within a body for use in a coolant system with a heat generating component and a heat exchanger.

This disclosure relates to a device for removing air from a coolant liquid of a coolant system. In a first embodiment, the device has body having a first end, a second opposed end, a top, and an opposed bottom. A swirl pot has a first fluid inlet for receiving fluid containing air of a first concentration. The swirl pot also has a first fluid outlet for conveying fluid having air of a second concentration lower than the first concentration and an air bubble outlet. The device further has a manifold comprising a first plurality of outlet pipes in communication with the first fluid outlet. A jumper fluid pipe may communicate the first fluid outlet with the manifold.

In a second embodiment of the device, a pump is added to the first embodiment and has a pump inlet, and a pump outlet. The pump inlet is in fluid communication with the first fluid outlet and the pump outlet is in fluid communication with the manifold.

In a third embodiment of the device, an electric motor is provided to drive the pump.

In a fourth embodiment, a device for removing air from a coolant liquid of a coolant system has a body having a first end, a second opposed end, a top and an opposed bottom. A swirl pot at the first end has a bottom, a top, a side wall connecting the bottom and the top, a first fluid inlet for receiving fluid containing air of a first concentration, a first fluid outlet for conveying fluid having air of a second concentration lower than the first concentration, and an air bubble outlet. The body also has a manifold having a first fluid pipe in fluid communication with a first plurality of outlet pipes extending in a first direction, a second fluid pipe extending parallel to the first fluid pipe and having a second plurality of outlet pipes extending in a second direction opposite the first direction. A jumper fluid pipe communicates the first fluid outlet with the first fluid pipe.

This disclosure also relates to a coolant system. The coolant system has a heat exchanger, a heat generating component, a coolant reservoir, a first pump, and piping. The piping connects the heat exchanger, the heat generating component, the first pump and the coolant reservoir to remove heat from the heat generating component. An air separator is connected to the piping having a body having a first end, a second opposed end, a top, and an opposed bottom. A swirl pot is present at the first end. The swirl has a bottom, a top, a side wall connecting the bottom and the top. A first fluid inlet extends through the side wall for receiving fluid containing air of a first concentration. A first fluid outlet extends through the side wall for conveying fluid having air of a second concentration lower than the first concentration. An air bubble outlet extends through the top. The body further has a manifold extending from the swirl pot to the second end. The manifold has a first fluid pipe in fluid communication with a first plurality of outlet pipes each extending transversely thereto and spaced there along. A jumper fluid pipe communicates the first fluid outlet with the first fluid pipe.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which.

DETAILED DESCRIPTION

Figure 1:
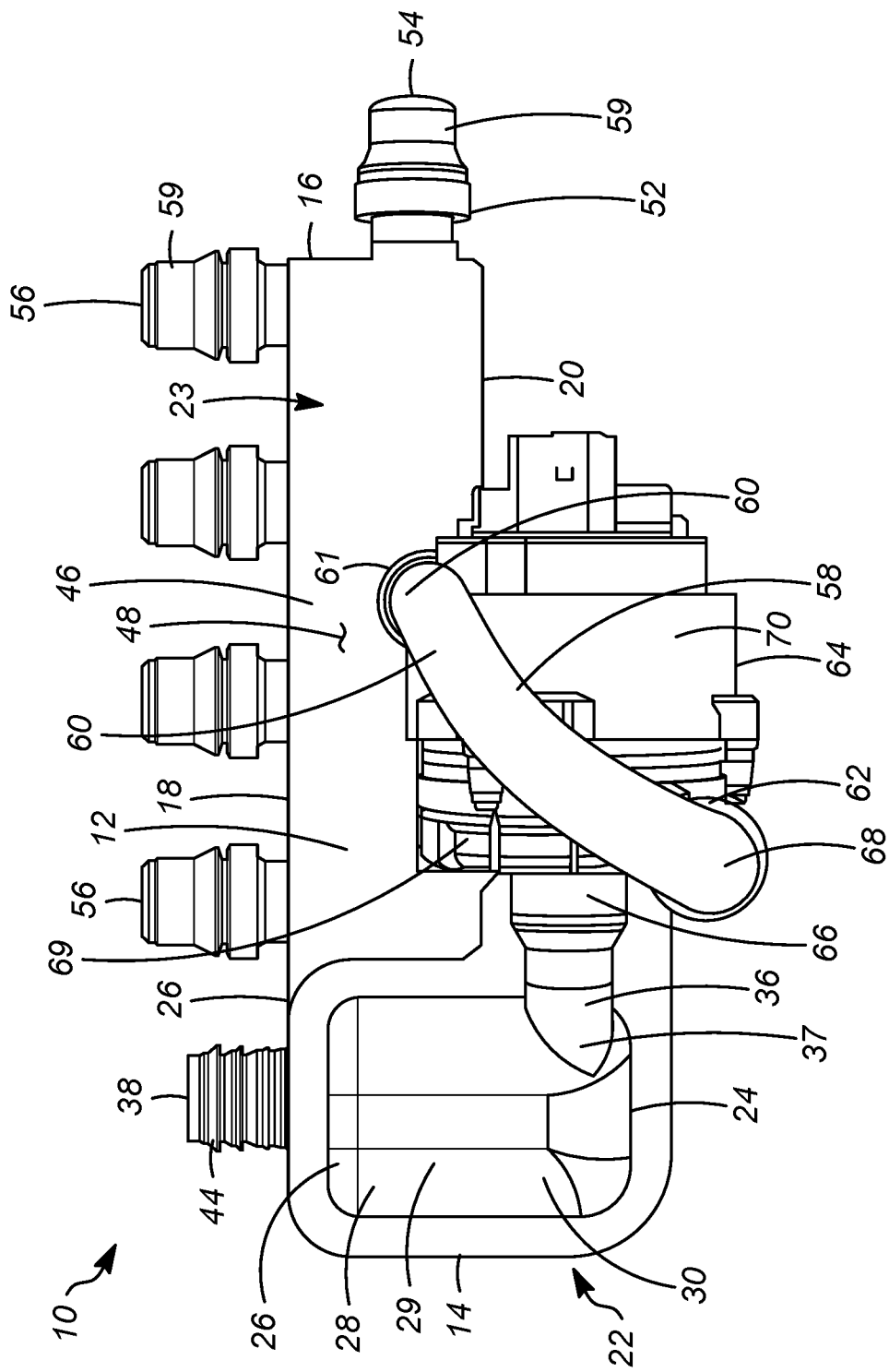
FIG. 1 is a perspective view of a front of a combined deaerator and manifold device.

While this disclosure is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
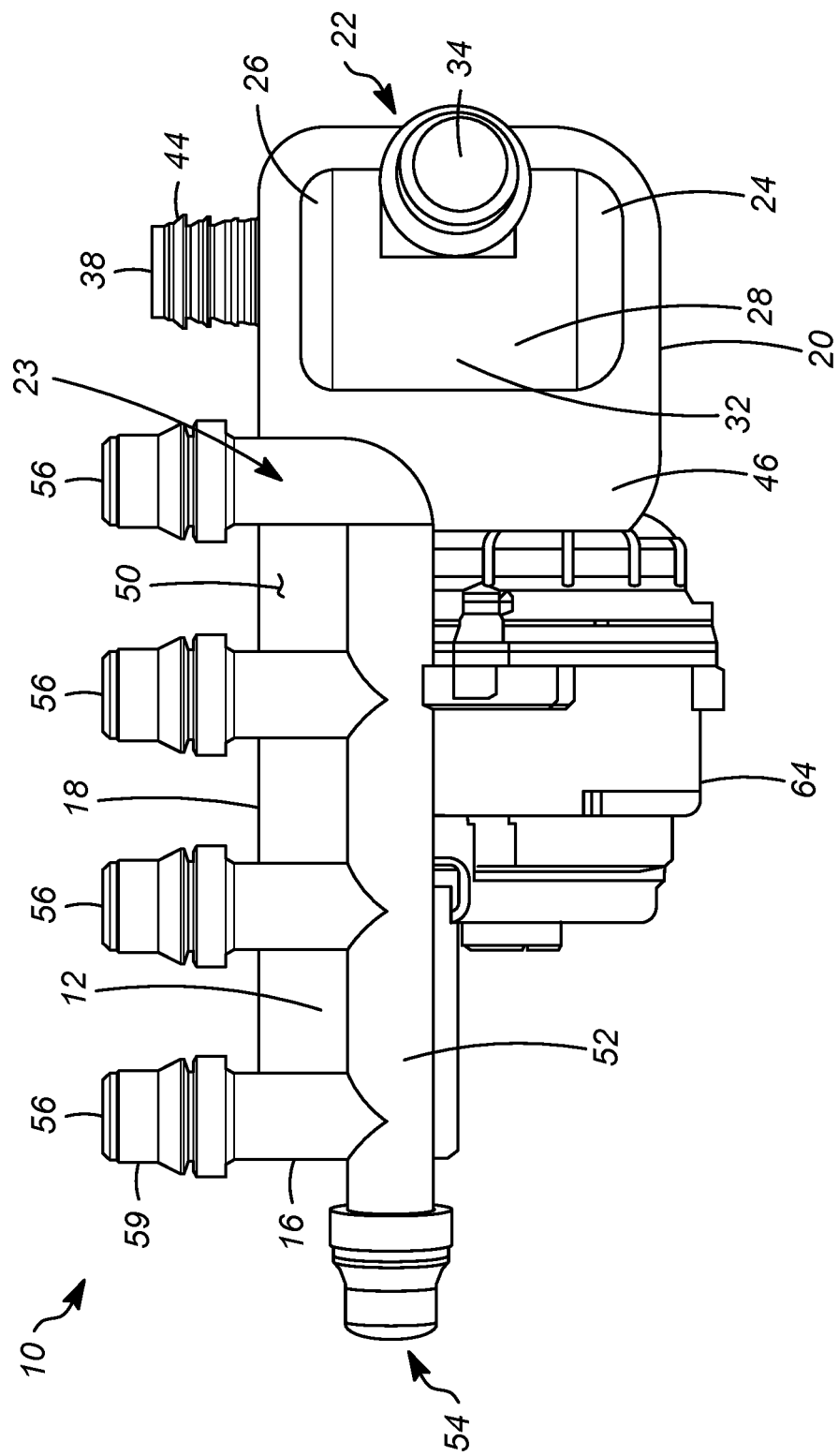
FIG. 2 is a perspective view of a back of a combined deaerator and manifold device.
Figure 3:
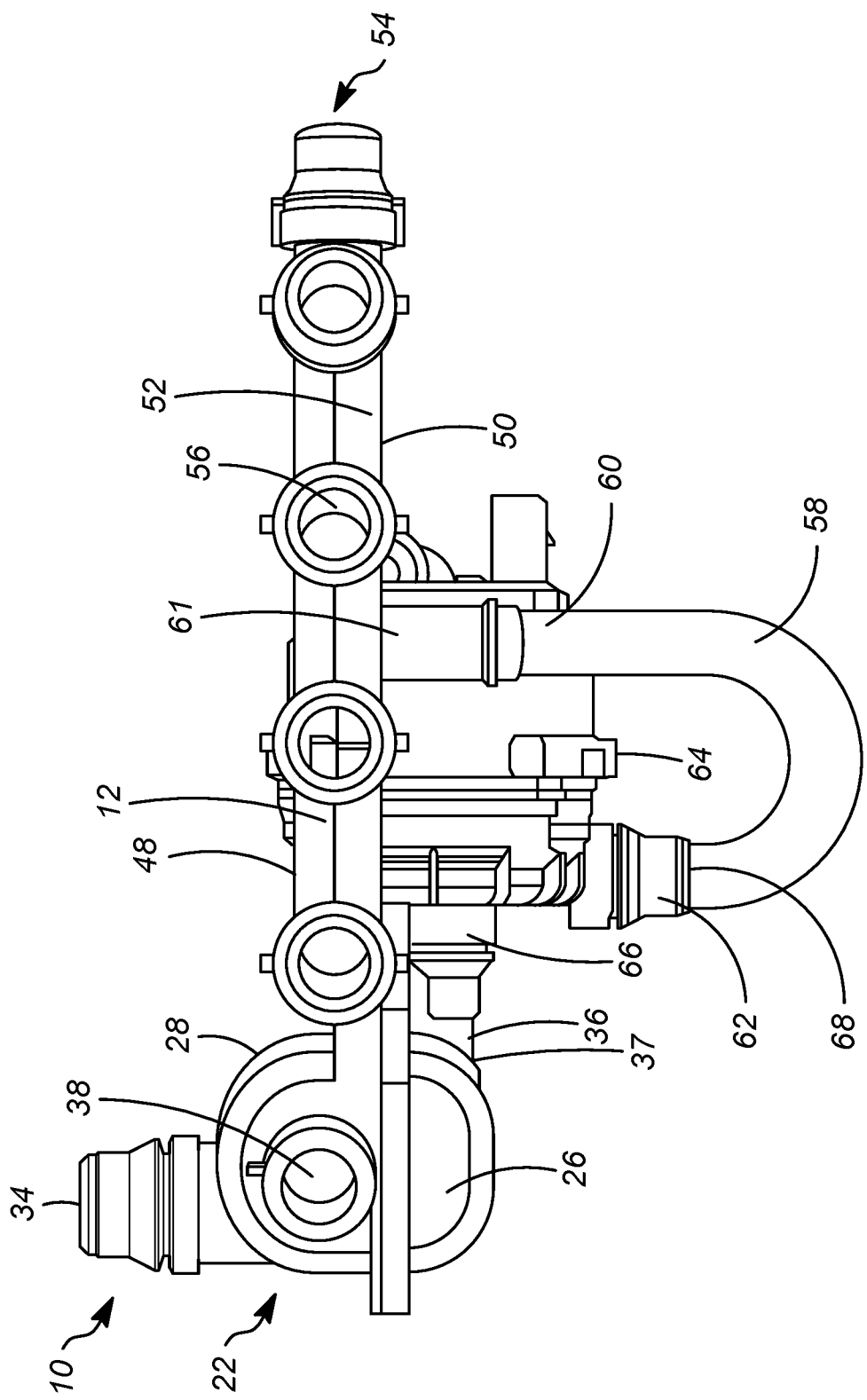
FIG. 3 is a top perspective view of a combined deaerator and manifold device.

FIGS. 1-3 show a combined deaerator and manifold device 10 comprises a body 12 having a first end 14, a second end 16 opposed to the first end, a top edge 18, and a bottom edge 20. The body 12 may have a unitary construction formed as a single part without need for assembly.

Figure 7:
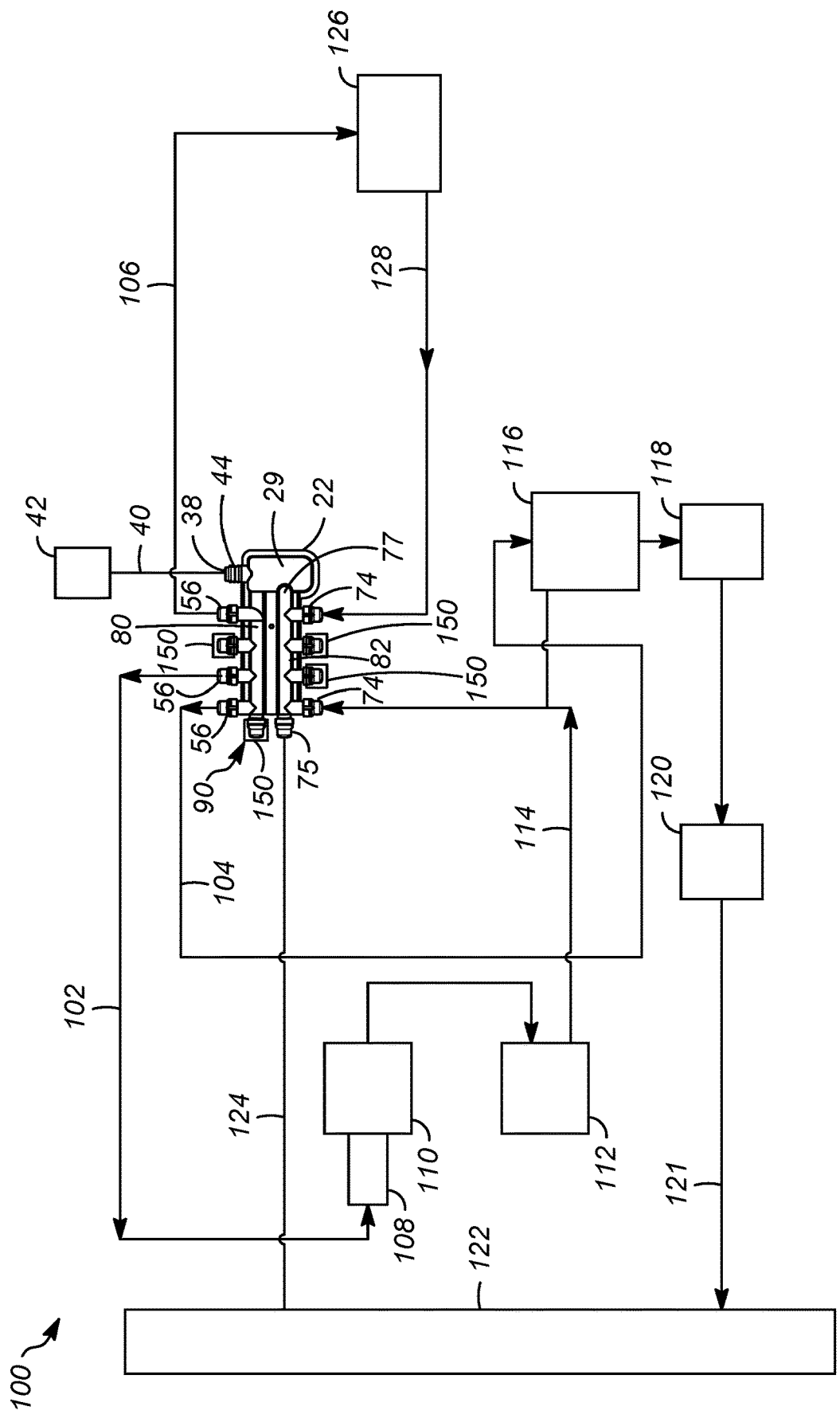
FIG. 7 is a schematic representation of a coolant system.

Turning to FIG. 1, a swirl pot 22 is at the first end 14 and a manifold 23 extends from the swirl pot 22 toward the second end 16. The body 12 has a front surface 48. The swirl pot 22 has a bottom 24, a top 26, and a generally curved side wall 28 connecting the bottom 24 and the top 26 and defining an internal chamber 29. The side wall 28 has a front portion 30. An air bubble outlet 38 extends through the top 26 and is for conveying air through a pipe 40 to a degas bottle 42 (FIG. 7). A barbed connector 44 is positioned outside the chamber at the inlet 38 for connecting the air bubble outlet 38 to the pipe 40. The first fluid outlet pipe 36 extending from the side wall 28 near the bottom 24 is for conveying fluid having an air content of a second concentration lower than the first concentration away from the swirl pot 22. The first fluid outlet pipe 36 extends through a second opening 37 in the side wall 28 proximate the bottom 24 and terminates at a point between the first end 14 and the second end 16 of the body 12.

Turning to FIG. 2, a first fluid inlet 34 extends through a rear portion 32 of the side wall 28 in a direction generally perpendicular thereto and intermediate of the top 26 and the bottom 24 of the swirl pot 22. In one embodiment, the first fluid inlet 34 receives fluid from a heat generating component and has an air content having a first concentration. The body 12 has a rear surface 50.

Turning to FIG. 3, the first fluid outlet pipe 36 extends from the second opening 37 in a direction generally tangentially to the side wall 28 and is disposed at about 90° clockwise from the first fluid inlet 34 when viewed from the top of the side wall. A manifold inlet 61 extends in through the rear surface 50 of the body 12 to the first fluid pipe 52.

Turning back to FIG. 2, the manifold 23 comprises a first fluid pipe 52 that extends from the swirl pot 22 to the second end 16 along the rear surface 50 and has a fluid outlet 54. A first plurality of outlet pipes 56 are in fluid communication with the first fluid pipe 52 and extend transversely thereto towards the top edge 18. The outlet pipes 56 are vertically oriented and horizontally spaced along the first fluid pipe 52 and are in fluid communication therewith. The outlet pipes 56 may terminate in a quick connect fitment 59 for connecting to pipes to heat generating components or the like external to the device 10. Four outlet pipes 56 are shown but this number could vary based on the needs of a coolant system. It is contemplated using from 1 to 10 outlet pipes 56, more preferably from 2 to 8 outlet pipes 56, even more preferably from 3 to 6 outlet pipes 56, and most preferably 4 to 5 outlet pipes 56.

Turning back to FIG. 1, an optional pump 64 has a fluid inlet 66 and a fluid outlet 68, a pump end wall 69 capping an internal impeller and a housing 70 containing a motor. In one embodiment, the pump motor is an electric motor. It is contemplated the pump 64 could be driven by other means such as a belt connected to a moving shaft driven by an engine of a vehicle. The pump 64 supplies fluid under pressure from the swirl pot 22 to the manifold inlet 61 to the first fluid pipe 52 via a jumper pipe 58. The jumper pipe 58 is external to the body and has a distal end 60 connected to the manifold inlet 61 and a proximal end 62 connected to the pump outlet 68.

Figure 4:
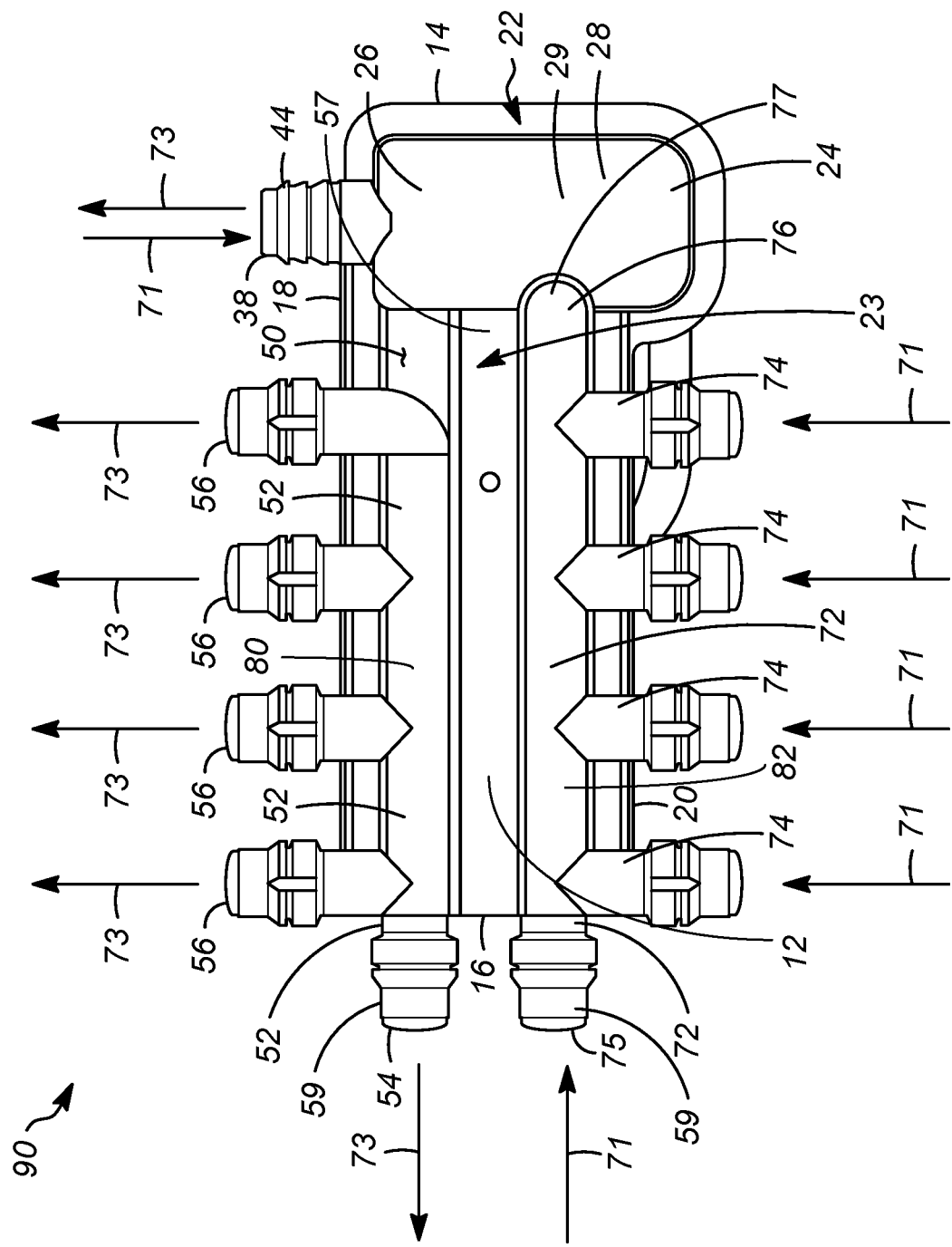
FIG. 4 is a perspective view of a rear of an alternative embodiment of a combined deaerator manifold device.
Figure 5:
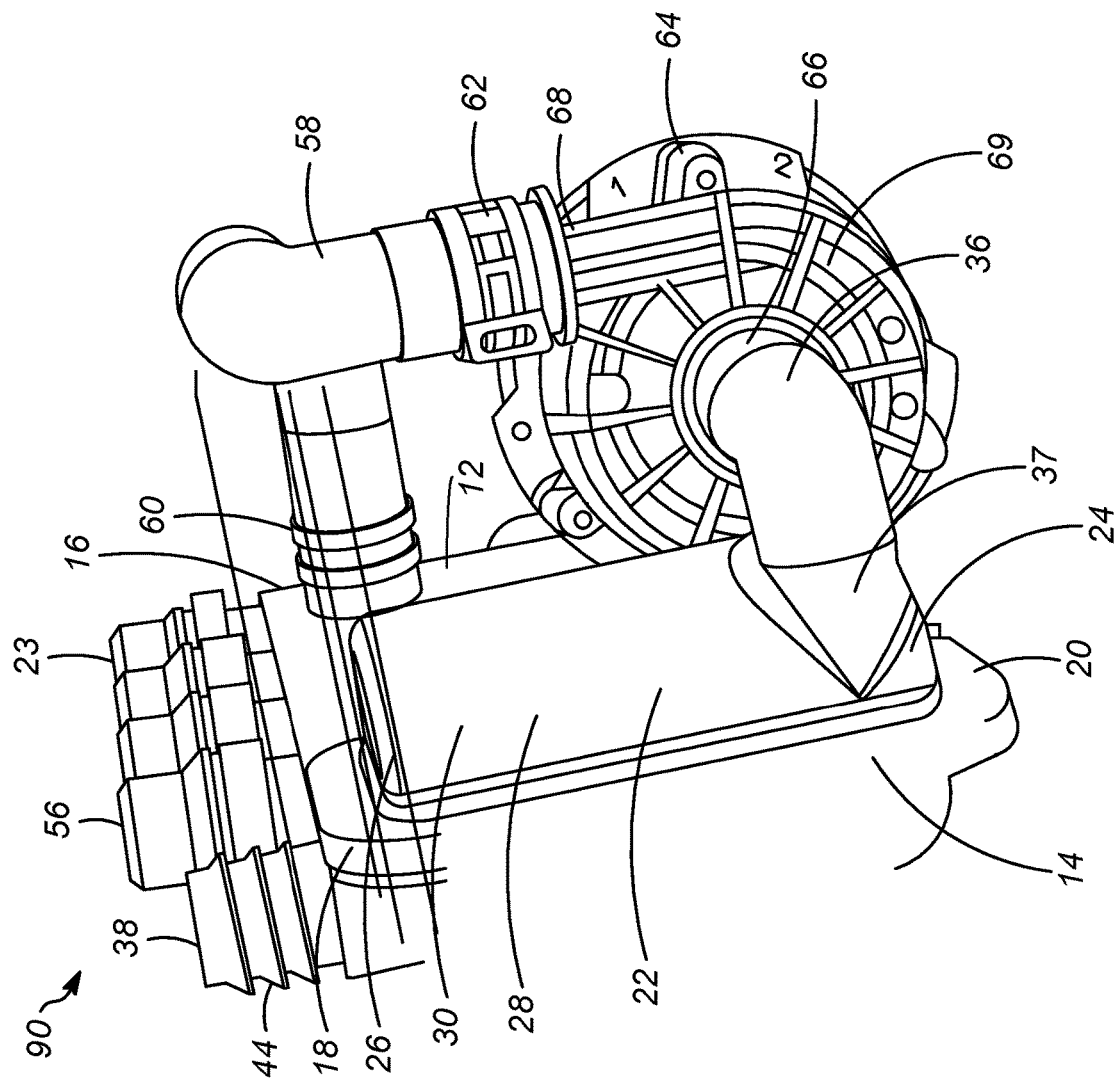
FIG. 5 is a perspective left side view of an alternative embodiment of the combined deaerator manifold device.
Figure 6:
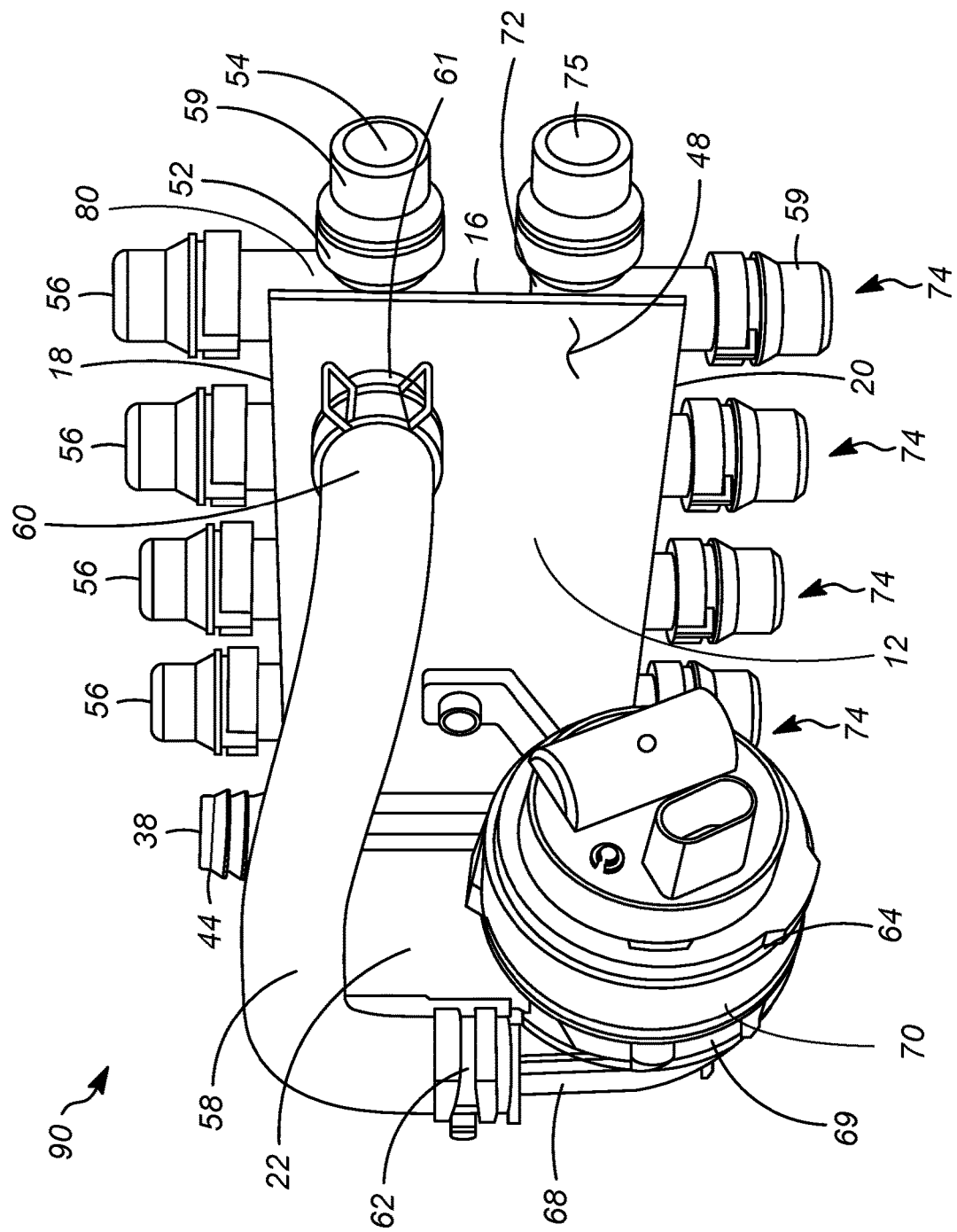
FIG. 6 is a perspective right side view of an alternative embodiment of the combined deaerator manifold device.

FIGS. 4-6 show an alternative embodiment of a combined deaerator and manifold device 90 shown in FIGS. 1-3. Turning to FIG. 4, the combined deaerator manifold device 90 comprises a body 12 having a first end 14, a second end 16 opposed to the first end, a top edge 18, and a bottom edge 20. The body 12 may have a unitary construction formed as a single part without need for assembly. A swirl pot 22 is at the first end 14 and a manifold 23 extends from the swirl pot 22 toward the second end 16. The body 12 has a rear surface 50 and a front surface that can be seen in FIG. 5. The swirl pot 22 has a bottom 24, a top 26, and a generally curved side wall 28 connecting the bottom 24 and the top 26 and defining an internal chamber 29. An air bubble outlet 38 extends through the top 26 and is for conveying air through a pipe 40 to a degas bottle 42 (FIG. 7). A barbed connector 44 is positioned outside the internal chamber 29 at the inlet 38 for connecting the air bubble outlet 38 to the pipe 40.

A fluid flow through the body 12 of the device 90 is shown with input flow arrows 71 and output flow arrows 73. The manifold 23 comprises an outlet manifold 80 and an inlet manifold 82. The outlet manifold 80 has a horizontal outlet pipe 52 connected at one end 57 with the interior chamber 29 of the swirl pot 22. The horizontal outlet pipe 52 is in fluid communication with four horizontally spaced and vertical output pipes 56. The horizontal outlet pipe terminates in an outlet 54 opposed to the end 57. The outlet pipes 52 and 56 can be connected to a heat dissipation device or heat dissipation devices such as a heat exchanger to cool the coolant fluid. While a single horizontal outlet pipe 52 is shown, the number of such pipes can vary from 1-5 outlet pipes 52. Similarly, while four vertical outlet pipes 54 are shown, this number could vary based on the needs of a coolant system, from 1 to 10 vertical outlet pipes 56, more preferably from 2 to 8, even more preferably from 2 to 6, and most preferably 3-5. By connection to the outlet pipes 54 and 56, components on several circuits may fed with deaerated liquid from the swirl pot 22 through the outlet manifold 80.

The inlet manifold 82 also has a horizontal fluid inlet pipe 72 extending parallel to the horizontal outlet pipe 52 and connects at a first end 76 to an opening 77 in the sidewall 28 of the swirl pot 22 and is in fluid communication with the interior 29 of the swirl pot 22. The horizontal inlet pipe 72 is also in fluid communication with four horizontally spaced vertical inlet pipes 74. The horizontal inlet pipe terminates in an inlet 75. The inlet pipes 72 and 74 are in fluid communication with the internal chamber 29 of the swirl pot 22. While a single horizontal inlet pipe 72 is shown, the number of such pipes can vary from 1-5 horizontal inlet pipes 72. Similarly, while four vertical inlet pipes 74 are shown, this number could vary based on the needs of a coolant system. It is contemplated using from 1 to 10 vertical inlet pipes 74, more preferably from 2 to 8, even more preferably from 2 to 6, and most preferably 3-5. The number of horizontal outlet pipes 52 can be the same or different from the number of horizontal inlet pipes 72. Also, the number of vertical outlet pipes 56 and the number of vertical inlet pipes 74 can be the same number or a different number within these ranges. By connection to the inlet pipes 72 and 74, components on several circuits may feed the swirl pot 22 through the inlet manifold 82.

Turning to FIG. 5, an optional pump 64 has a fluid inlet 66 and a fluid outlet 68, a pump end wall 69 capping an internal impeller and a housing 70 containing a motor. In one embodiment, the pump motor is an electric motor. It is contemplated the pump 64 could be driven by other means such as a belt connected to a moving shaft driven by an engine of a vehicle. The side wall 28 of the swirl pot 22 has a front portion 30. Turning to FIG. 6, a jumper pipe 58 is external to the body and has a distal end 60 connected to the manifold inlet 61 and a proximal end 62 connected to the pump outlet 68. The manifold inlet 61 extends through the front surface 48 of the body 12 to the outlet manifold 80. The pump 64 supplies fluid under pressure from the swirl pot 22 through the jumper pipe 58 to the manifold inlet 61 of the outlet manifold 80 to the first fluid pipe 52.

As shown in FIG. 7, the combined deaerator manifold device 90 is for use in a coolant system 100, more preferably a vehicle coolant system, and most preferably a coolant system 100 for a battery-operated electric vehicle. The combined deaerator manifold device 10 could be substituted for the device 90 in the system 100. The coolant system 100 has a first coolant loop 102 a second coolant loop 104, and a third coolant loop 106. The coolant loops 102, 104, 106 have piping connected to fluid outlets 56 for conveying a coolant fluid such as antifreeze such as comprising ethylene glycol solution pumped from the swirl pot 22 into contact with heat generating components.

For example, the first coolant loop 102 may connect from a fluid outlet pipe 56 of the outlet manifold 80 to a DC/DC converter 108, a battery charger 110, and optional other component or components 112 to take away heat therefrom. A return pipe 114 returns to an inlet pipe 74 of the inlet manifold 82 of the deaerator manifold device 90 which feeds the swirl pot 22.

The second coolant loop 104 conveys coolant fluid from a fluid outlet pipe 56 of the outlet manifold 80 to a first power distribution unit 116, a second power distribution unit 118, and an optional unit 120 or units, then through a heat exchanger inline 121 to a heat exchanger 122 such as a radiator. A radiator outline 124 returns cooled fluid to the inlet 75 of the inlet manifold 82 of the deaerator manifold device 90 which feeds the swirl pot 22.

The third coolant loop 106 conveys coolant fluid from a fluid outlet pipe 56 of the inlet manifold 82 to a battery 126 such as a lithium-ion battery used to power electric vehicles. A return line 128 connects to an inlet 74 of the inlet manifold 82 of the deaerator manifold device 90 which feeds the swirl pot 22.

Additional coolant loops can be provided and can be connected to the inactive outlet pipes 56 and inlet pipes 74 that are shown with caps 150.

An air bubble outlet 38 extends through the top 26 and is for conveying air through a pipe 40 to a degas bottle 42. It is envisioned that a thermocouple port may be integrated into the device 10, 90.

The body 12 can be made unitarily of any suitable material including plastics, metals, and composite materials. Suitable plastics include thermoplastics and thermosetting polymers. Suitable plastics include polyolefins, polyesters, polyamides, polyethers, polysulfones, polyetheramides, polyurethanes, polystyrenes, or others well known to those skilled in the art. The plastics can be homopolymers, copolymers, terpolymers, and block copolymers. Most preferably the plastic is glass filled nylon 6,6 (PA66), or a glass filled polypropylene (PP) or an unfilled PP. The unitary body can be formed by injection molding, plastic welding techniques, thermoforming or other technique well known to those of ordinary skill in the art. Suitable metals include aluminum, iron, steel, brass, copper, tin, and alloys thereof. The metals can be formed into the body using casting, forging or other techniques well known to those of skill in the art.

Many modifications and variations of the present invention are possible in light of the above teachings. It is, therefore, to be understood within the scope of the appended claims the invention may be protected otherwise than as specifically described. The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "vessel," or "system," within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A device for removing air from a coolant liquid of a coolant system comprising:
    a body having a first end, a second opposed end, a top and an opposed bottom;
    a first manifold comprising a first plurality of inlet Pipes in fluid communication with the first manifold;
    a second manifold, integral with the first manifold, comprising a second plurality of outlet pipes in fluid communication with the second manifold; and
    a swirl pot, integral with the first manifold and the second manifold having a first fluid inlet for receiving fluid containing air of a first concentration, a first fluid outlet for conveying fluid having air of a second concentration lower than the first concentration, and an air bubble outlet,
    wherein the first manifold, the second manifold, and the swirl pot are fluidically connected to one another such that the swirl pot is located between the first and second manifolds.

2. The device of claim 1 further comprising a barbed connector on the top in fluid communication with the air bubble outlet.

3. The device of claim 1 further comprising a jumper fluid pipe that communicates the first fluid outlet with one of the first manifold and the second manifold.

4. The device of claim 1 wherein each of the plurality of outlet pipes has a portion that extends beyond the top of the body.

5. The device of claim 4 further comprising a manifold inlet extending through the body in fluid communication with one of the first manifold and the second manifold.

6. The device of claim 1 further comprising a pump external to the body and having a pump inlet, and a pump outlet, the pump inlet in fluid communication with the first fluid outlet and the pump outlet in communication with one of the first manifold and the second manifold.

7. The device of claim 6 wherein the pump is driven by an electric motor.

8. The device of claim 1 wherein the body is unitary.

9. The device of claim 1 wherein the first manifold is an outlet manifold and the second manifold is an inlet manifold in fluid communication with said first fluid inlet.

10. A device for removing air from a coolant liquid of a coolant system comprising:
   a body having a first end, a second opposed end, a top and an opposed bottom;
   a first manifold having a first fluid pipe in fluid communication with a first plurality of inlet pipes extending in a first direction,
   a second manifold, integral with the first manifold, having a second fluid pipe extending parallel to the first fluid pipe and having a second plurality of outlet pipes extending in a second direction opposite the first direction; and
   a swirl pot at the first end, integral with the first manifold and the second manifold, having a bottom, a top, a side wall connecting the bottom and the too, a first fluid inlet for receiving fluid containing air of a first concentration, a first fluid outlet for conveying fluid having air of a second concentration lower than the first concentration, and an air bubble outlet,
   wherein the first manifold, the second manifold, and the swirl pot are fluidically connected to one another such that the swirl pot is located between the first and second manifolds.

11. The device of claim 10 further comprising a jumper fluid pipe communicating the first fluid outlet with the first fluid pipe, wherein the jumper fluid pipe is external to the body.

12. The device of claim 10 wherein the body is a unitary body.

13. The device of claim 12 wherein the body is a glass filled PA66, a glass filled PP or an unfilled PP.

14. The device of claim 10 wherein each of the first plurality of outlet pipes has a portion that extends beyond the top of the body, and each of the second plurality of outlet pipes has a portion that extends beyond the bottom of the body.

15. A coolant system comprising:
   a heat exchanger;
   a heat generating component;
   a coolant reservoir;
   a first pump;
   piping connecting the heat exchanger, the heat generating component, the first pump and the coolant reservoir to remove heat from the heat generating component;
   an air separator connected to the piping having a body having a first end, a second opposed end, a top and an opposed bottom;
   a first manifold having a first fluid pipe in fluid communication with a first plurality of inlet pipes;
   a second manifold, integral with the first manifold, having a second fluid pipe in fluid communication with a second plurality of outlet pipes; and
   a swirl pot at the first end, integral with the first manifold and the second manifold, having a bottom, a top, a side wall connecting the bottom and the top, a first fluid inlet for receiving fluid containing air of a first concentration from the heat generating component, a first fluid outlet for conveying fluid having air of a second concentration lower than the first concentration to the heat exchanger, and an air bubble outlet connected to the coolant reservoir,
   wherein the first manifold, the second manifold, and the swirl pot are fluidically connected to one another such that the swirl pot is located between the first and second manifolds.

16. The system of claim 15 further comprising a jumper fluid pipe communicating the first fluid outlet with the first fluid pipe, wherein the jumper fluid pipe is external to the body.

17. The system of claim 16 further comprising a second pump external to the body and having a pump inlet and a pump outlet, the pump inlet in fluid communication with the first fluid outlet and the pump outlet in fluid communication with the jumper fluid pipe.

18. The system of claim 15 wherein each of the first plurality of outlet pipes has a portion that extends beyond the top of the body.

19. The system of claim 18 wherein each of the first and second plurality of outlet pipes has a fitment for connecting to piping.

20. The system of claim 17 wherein the second pump is driven by an electric motor.

* * * * *